United States Patent
Nam et al.

(10) Patent No.: US 11,520,405 B1
(45) Date of Patent: Dec. 6, 2022

(54) SSVEP-BASED STIMULUS DETECTION DEVICE AND METHOD THEREOF

(71) Applicants: Hyundai Motor Company, Seoul (KR); Kia Corporation, Seoul (KR)

(72) Inventors: Seung Kyu Nam, Seoul (KR); Tae Jun Lee, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/580,013

(22) Filed: Jan. 20, 2022

(30) Foreign Application Priority Data

Jul. 5, 2021 (KR) .................. 10-2021-0088008

(51) Int. Cl.
*G06F 3/01* (2006.01)
(52) U.S. Cl.
CPC .................. *G06F 3/015* (2013.01)
(58) Field of Classification Search
CPC ....................................................... G06F 3/015
USPC ........................................................ 345/156
See application file for complete search history.

(56) References Cited

U.S. PATENT DOCUMENTS

| | | |
|---|---|---|
| 2013/0211276 A1 | 8/2013 | Luo et al. |
| 2019/0201691 A1* | 7/2019 | Poltorak ............... A61M 21/00 |
| 2019/0247662 A1* | 8/2019 | Poltroak .............. A61B 5/0816 |
| 2019/0307350 A1* | 10/2019 | Sridhar ................ A61B 5/6803 |
| 2020/0297263 A1 | 9/2020 | Kouider et al. |

FOREIGN PATENT DOCUMENTS

| | | |
|---|---|---|
| JP | 2010-057658 A | 3/2010 |
| JP | 2013-004006 A | 1/2013 |
| KR | 10-2019-0030611 A | 3/2019 |
| KR | 10-2019-0030612 A | 3/2019 |

OTHER PUBLICATIONS

Jiang, Jing, et al. "Incorporation of dynamic stopping strategy into the high-speed SSVEP-based BCIs." Journal of neural engineering (2018).

(Continued)

*Primary Examiner* — Calvin C Ma
(74) *Attorney, Agent, or Firm* — Morgan, Lewis & Bockius LLP

(57) ABSTRACT

The present invention relates to a Steady-State Visual Evoked Potential (SSVEP)-based stimulus detection device and a method thereof. The SSVEP-based stimulus detection device may include a sensor that acquires a multichannel ElectroEncephaloGram (EEG) signal, a storage that stores a plurality of reference signals having different stimulation frequencies, and a controller that periodically determines correlation coefficients between the plurality of reference signals and the multichannel EEG signal for a reference time, normalizes the determined plurality of correlation coefficients for stimuli, determines slopes of regression lines for stimuli by performing analysis of covariance on the normalized plurality of correlation coefficients for stimuli, and detects a stimulus intended by a user according to the determined slopes of the regression lines for stimuli.

17 Claims, 6 Drawing Sheets

(56) References Cited

OTHER PUBLICATIONS

Yin, Erewei, et al. "A dynamically optimized SSVEP brain-computer interface (BCI) speller." IEEE Transactions on Biomedical Engineering (2014).
Cecotti, H. "Adaptive Time Segment Analysis for Steady-State Visual Evoked Potential Based Brain-Computer Interfaces." IEEE Transactions on Neural Systems and Rehabilitation Engineering (2020).
Guangyu Bin, et al. "An online multichannel SSVEP-based brain-computer interface using a canonical correlation analysis method." Journal of neural engineering (2009).

* cited by examiner

SSVEP-BASED STIMULUS DETECTION DEVICE AND METHOD THEREOF

CROSS-REFERENCE TO RELATED APPLICATION

The present application claims priority to Korean Patent Application No. 10-2021-0088008, filed on Jul. 5, 2021, the entire contents of which is incorporated herein for all purposes by this reference.

BACKGROUND OF THE INVENTION

Field of the Invention

The present invention relates to a technology for rapidly and accurately detecting a stimulus intended by a user based on a Steady-State Visual Evoked Potential (SSVEP) signal in a Brain-Computer Interface (BCI) system.

Description of Related Art

In general, ElectroEncephaloGram (EEG) signals are unique to each individual (Inter-subject variability), and further the EEG signals vary with time because the state of a brain fluctuates every moment even for the same individual (Inter-trial variability).

A BCI system needs to not only have a high recognition accuracy and a fast recognition speed, but further be applied to anyone without a prior learning process. For this, issues such as inter-subject variability and inter-trial variability need to be addressed.

SSVEP is EEG signals generated by repetitive visual stimuli (frequency stimuli). The SSVEP-based BCI system may apply a fixed time window for each test through offline analysis to detect a stimulus intended by a user (recognize a user intention) based on SSVEP. Here, the time window represents a time required to detect an SSVEP signal intended by the user from the EEG signal (i.e., the time for collecting EEG signals), and there is a trade-off relationship in which, as the time window increases, accuracy of recognition (detection of the SSVEP signal intended by the user) increases, but the speed of the recognition decreases, and as the time window decreases, the speed of recognition increases, but the accuracy of recognition decreases.

When a fixed time window is applied to the BCI system, the inter-subject variability problem and inter-trial variability problem cannot be solved, so an adaptive time window needs to be applied.

The BCI system to which the adaptive time window is applied may recognize the SSVEP signal as a signal intended by the user when the characteristic of the SSVEP signal exceeds a predefined threshold. In the instant case, there is a problem that a prior learning process is necessarily required for application to the user because the threshold is estimated using the same user's prior data (subject-specific) or the other user's prior data (subject-independent).

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a Steady-State Visual Evoked Potential (SSVEP)-based stimulus detection device and a method thereof, which periodically determine correlation coefficients between a plurality of reference signals having different stimulation frequencies and multichannel EEG signals of a user for a reference time, determine slopes of regression lines for stimuli by performing analysis of covariance on a plurality of correlation coefficients for stimuli (stimulation frequencies) as determined, and detect the user's intended stimulus through a plurality of comparison between the determined slopes of the regression lines for stimuli to rapidly and accurately detect the stimulus intended by the user without a prior learning process.

The objects of the present invention are not limited to the above-mentioned objects, and other objects and advantages of the present invention which are not mentioned may be understood by the following description, and will be more clearly understood by embodiments of the present invention. It will also be readily apparent that the objects and advantages of the present invention may be realized by the instrumentalities and combinations particularly pointed out in the appended claims.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a Steady-State Visual Evoked Potential (SSVEP)-based stimulus detection device may include a sensor that acquires a multichannel ElectroEncephaloGram (EEG) signal, a storage that stores a plurality of reference signals having different stimulation frequencies, and a controller that periodically determines correlation coefficients between the plurality of reference signals and the multichannel EEG signal for a reference time, normalizes the determined plurality of correlation coefficients for stimuli, determines slopes of regression lines for stimuli by performing analysis of covariance on the normalized plurality of correlation coefficients for stimuli, and detects a stimulus intended by a user according to the determined slopes of the regression lines for stimuli.

According to various exemplary embodiments of the present invention, the controller may be configured to determine significance probabilities for differences between a largest slope among the determined slopes of regression lines for stimuli and each of remaining slopes, and when all of the significance probabilities satisfy a significance level, detect a stimulus corresponding to a largest correlation coefficient of the plurality correlation coefficients as the stimulus intended by the user.

According to various exemplary embodiments of the present invention, the controller may be configured to determine the significance probabilities for differences between the largest slope among the determined slopes of regression lines for stimuli and each of the remaining slopes, and when all of the significance probabilities do not satisfy the significance level, additionally determine and accumulate correlation coefficients between the plurality of reference signals and the multichannel EEG signal.

According to various exemplary embodiments of the present invention, the controller may normalize the determined plurality of correlation coefficients for stimuli through softmax.

According to various exemplary embodiments of the present invention, the correlation coefficients may be Canonical Correlation Analysis (CCA) coefficients.

According to various exemplary embodiments of the present invention, the multichannel EEG signal may be derived by Steady-State Visual Evoked Potential (SSVEP).

According to various exemplary embodiments of the present invention, the controller may be configured to determine input timing of the user based on the normalized plurality of correlation coefficients for stimuli.

According to various exemplary embodiments of the present invention, the SSVEP-based stimulus detection device may further include a display that displays the stimulus intended by the user.

According to various exemplary embodiments of the present invention, the correlation coefficient may be one of a Filter Bank Canonical Correlation Analysis (FBCCA) coefficient or a Task-Related Component Analysis (TRCA) coefficient.

According to various aspects of the present invention, an SSVEP-based stimulus detection method may include periodically determining, by a controller, correlation coefficients between a plurality of reference signals and a multichannel ElectroEncephaloGram (EEG) signal for a reference time, normalizing, by the controller, the determined plurality of correlation coefficients for stimuli, determining, by the controller, slopes of regression lines for stimuli by performing analysis of covariance on the normalized plurality of correlation coefficients for stimuli, and detecting, by the controller, a stimulus intended by a user based on the determined slopes of regression lines for stimuli.

According to various exemplary embodiments of the present invention, the detecting of the stimulus intended by the user includes determining significance probabilities for differences between a largest slope among the determined slopes of regression lines for stimuli and each of remaining slopes, when all of the significance probabilities satisfy a significance level, detecting a stimulus corresponding to a largest correlation coefficient of the plurality correlation coefficients as the stimulus intended by the user, and when all of the significance probabilities do not satisfy the significance level, additionally determining and accumulating correlation coefficients between the plurality of reference signals and the multichannel EEG signal.

According to various exemplary embodiments of the present invention, the normalizing of the determined plurality of correlation coefficients for stimuli may include normalizing the determined plurality of correlation coefficients for stimuli through softmax.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
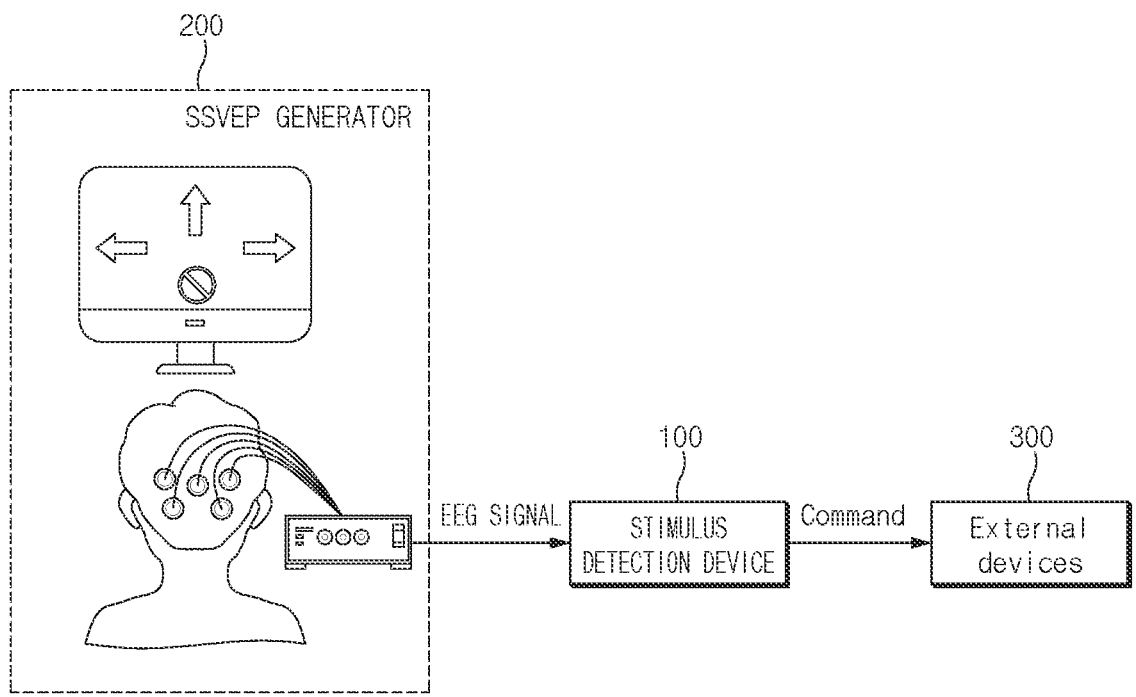
FIG. 1 is an exemplary diagram of a BCI system to which an SSVEP-based stimulus detection device according to various exemplary embodiments of the present invention are applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is an exemplary diagram of a BCI system to which an SSVEP-based stimulus detection device according to various exemplary embodiments of the present invention are applied.

Referring to FIG. 1, a BCI system to which an SSVEP-based stimulus detection device according to various exemplary embodiments of the present invention are applied may include a stimulus detection device 100, a Steady-State Visual Evoked Potential (SSVEP) generator 200, and external devices 300.

The above components will be described in detail below. First, the stimulus detection device 100, which is a core gist of the present invention, may periodically determine correlation coefficients between a plurality of reference signals having different stimulation frequencies and a multichannel EEG signal of a user for a reference time, determine slopes of regression lines for stimuli by performing analysis of covariance on a plurality of correlation coefficients for stimuli (stimulation frequencies) as determined, and detect the user's intended stimulus through multiple comparison between the determined slopes of the regression lines for stimuli. Herein, the multiple comparison refers to a process of determining a significance probability (P-value) for differences between the largest slope among the determined slopes of the regression lines for stimuli and each of the remaining slopes.

For example, when the slope is large in the order of the first stimulus, the second stimulus, and the third stimulus, the stimulus detection device 100 may determine a first significance probability between a slope of the first stimulus and a slope of the second stimulus, and a second significance probability between the slope of the first stimulus and a slope of the third stimulus The stimulus detection device 100 may determine that there is a statistically significant difference when all of the significance probabilities determined through the multiple comparison satisfy a significance level (significance probability<significance level) and detect a stimulus corresponding to the largest correlation coefficient among the plurality of correlation coefficients as a stimulus intended by the user. Here, the significance level may be set to, for example, any one of 0.05, 0.01, and 0.001.

The SSVEP generator 200 may provide a user with a visual stimulus corresponding to a control command for the external device 300 and induce the user to generate an EEG signal including electroencephalogram corresponding to the visual stimulus. For example, when the user looks at an arrow in the forward direction, an EEG signal of the user may include electroencephalogram corresponding to the forward direction thereof. Accordingly, the stimulus detection device 100 may detect electroencephalogram corresponding to the arrow in the forward direction from the user's EEG signal.

The external device 300 may include a personal mobility, and may include, for example, a wheelchair, an exoskeleton, and the like.

Figure 2:
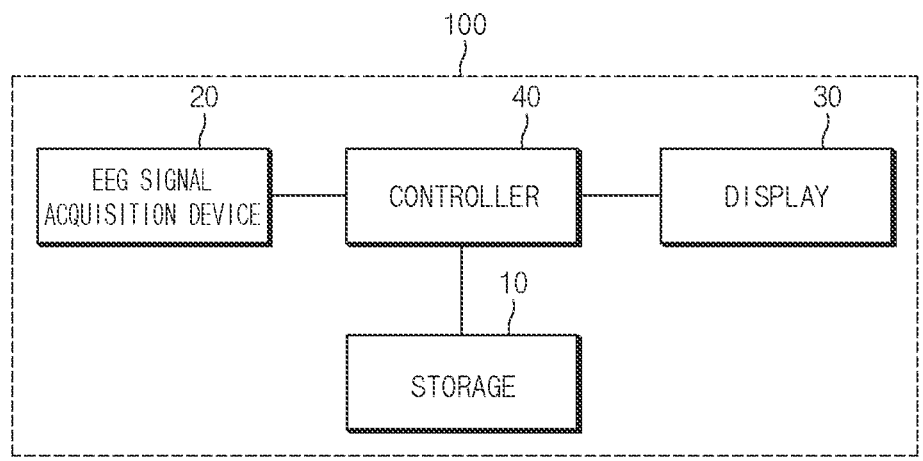
FIG. 2 is a schematic diagram of an SSVEP-based stimulus detection device according to various exemplary embodiments of the present invention.

FIG. 2 is a schematic diagram of an SSVEP-based stimulus detection device according to various exemplary embodiments of the present invention.

Referring to FIG. 2, the SSVEP-based stimulus detection device 100 according to various exemplary embodiments of the present invention may include storage 10, an EEG signal acquisition device 20, a display 30, and a controller 40. In the instant case, according to a method for performing the SSVEP-based stimulus detection device 100 according to various exemplary embodiments of the present invention, components may be combined with each other as one entity, or some components may be omitted.

The above components will be described in detail below. First, the storage 10 may store various logics, algorithms and programs required during the process of periodically determining correlation coefficients between a plurality of reference signals having different stimulation frequencies and a multichannel EEG signal of a user for a reference time, determining slopes of regression lines for stimuli by performing analysis of covariance on a plurality of correlation coefficients for stimuli (stimulation frequencies) as determined, and detecting the user's intended stimulus through multiple comparison between the determined slopes of the regression lines for stimuli.

The storage 10 may set a threshold time (e.g., 4 seconds) as the maximum time required to perform a process of detecting a stimulus intended by the user. The threshold time may serve as a reference point for distinguishing between a state in which a stimulus intended by the user is configured to be detected and a state in which a stimulus intended by the user is disable to be detected.

The storage 10 may store a reference time (e.g., 0.5 seconds) as a time required until detection of a stimulus intended by the user is attempted. That is, the reference time may refer to a time for starting detection of a stimulus intended by the user. The present reference time may mean a time required to collect a minimum EEG signal used to detect a stimulus intended by the user. As a result, a stimulus intended by the user may be detected based on EEG signals collected during the reference time.

The storage 10 may store a set time (e.g., 0.1 second) for increasing the reference time when a stimulus intended by the user is not detected based on the EEG signals collected during the reference time. The set time $\Delta t$) may be added to the reference time, and a process of adding the set time to the reference time as described above may be repeatedly performed within a range that does not exceed the threshold time. In the instant case, the set time may refer to a cycle of performing CCA.

The storage 10 may store a plurality of reference signals $(Y_{f1}, Y_{f2}, \ldots, Y_{fk})$ having different stimulation frequencies (f1, f2, . . . , fk).

The storage 10 may store a Canonical Correlation Analysis (CCA) algorithm and an Analysis of Covariance algorithm.

The storage 10 may include at least one type of storage medium of memories such as a flash memory type memory, a hard disk type memory, a micro type memory, and a card type memory (e.g., a Secure Digital card (SC card) or an eXtream Digital card (XD card)), a Random Access Memory (RAM), an Static RAM (SRAM), a Read Only Memory (ROM), a Programmable ROM (PROM), an Electrically Erasable PROM (EEPROM), a Magnetic RAM (MRAM), and an optical disk type memory.

The EEG signal acquisition device 20 may acquire a multichannel EEG signal generated by the SSVEP generator 200. The EEG signal acquisition device 20 may be implemented with a sensor.

The display 30 may display the stimulus (control command) intended by the user which is detected by the controller 40 such that the user is able to identify the stimulus.

The controller 40 may perform overall control such that each of the above components normally performs its function. The controller 40 may be implemented in a form of hardware or software, or may be implemented in a combination of hardware and software. The controller 40 may be implemented with a microprocessor, but is not limited thereto The controller 40 may perform a variety of control in a process of periodically determining correlation coefficients between a plurality of reference signals having different stimulation frequencies and a multichannel EEG signal of a user for a reference time, determining slopes of regression lines for stimuli by performing analysis of covariance on a plurality of correlation coefficients for stimuli (stimulus frequencies) as determined, performing multiple comparison between the determined slopes of the regression lines for stimuli, and detecting the user's intended stimulus based on the multiple comparison.

The controller 40 may determine a significance probability (P-value) for differences between the largest slope among the determined slopes of the regression lines for stimuli and each of the remaining slopes, determine that there is a statistically significant difference when all of the significance probabilities determined through the multiple comparison satisfy a significance level (significance probability<significance level), and detect a stimulus corresponding to the largest correlation coefficient among the plurality of correlation coefficients as a stimulus intended by the user.

Hereinafter, the operation of the controller 40 will be described in detail with reference to FIG. 3 and FIG. 4.

Figure 3:
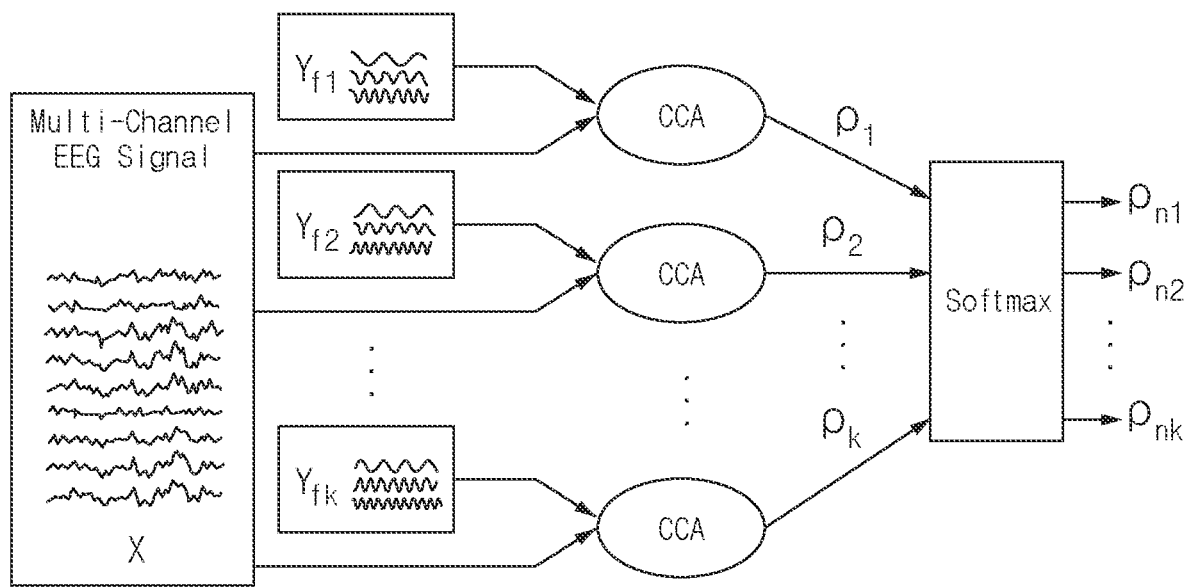
FIG. 3 is an exemplary diagram illustrating a process of determining a correlation coefficient in a controller provided in an SSVEP-based stimulus detection device according to various exemplary embodiments of the present invention.

FIG. 3 is an exemplary diagram illustrating a process of determining a correlation coefficient in a controller provided in an SSVEP-based stimulus detection apparatus according to various exemplary embodiments of the present invention;

As shown in FIG. 3, the controller 40 may determine correlation coefficients between a plurality of reference signals ($Y_{f1}$, $Y_{f2}$, ..., $Y_{fk}$) having different stimulation frequencies (f1, f2, ..., fk), which are stored in the storage 10, and multichannel EEG signal (X) of the user, which are acquired through the EEG signal acquisition device 20.

That is, the controller 40 may determine a correlation coefficient ($\rho_1$) by performing CCA based on the reference signal ($Y_{f1}$) having the first stimulation frequency f1 and the multichannel EEG signal X, determine a correlation coefficient ($\rho_2$) by performing CCA based on the reference signal ($Y_{f2}$) having the second stimulation frequency (f2) and the multichannel EEG signal (X), and determine a correlation coefficient ($\rho_k$) by performing CCA based on the reference signal ($Y_{fk}$) having the k-th stimulation frequency (fk) and the multichannel EEG signal (X).

Thereafter, the controller 40 may perform normalization by performing a softmax algorithm on the determined correlation coefficients. That is, the controller 40 may determine the normalized CCA coefficients ($\rho_{n1}$, $\rho_{n2}$, $\rho_{nk}$) by applying the softmax to the correlation coefficients ($\rho_1$, $\rho_2$, $\rho_k$).

Figure 4:
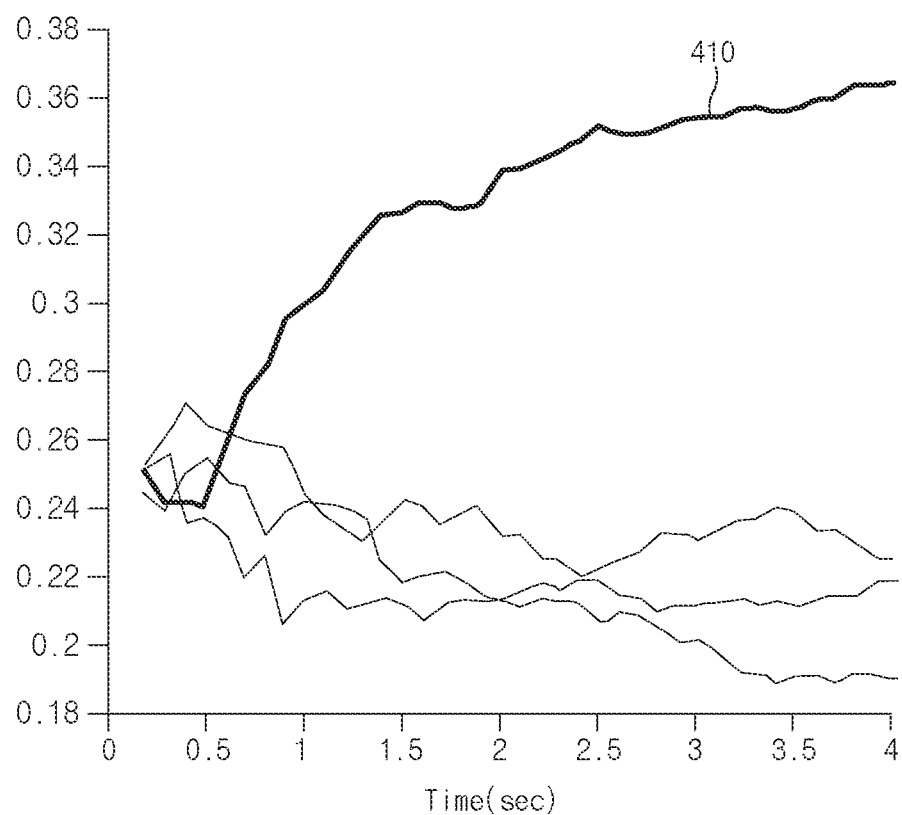
FIG. 4 is an exemplary diagram of a normalized CCA coefficient determined by a controller provided in an SSVEP-based stimulus detection device according to various exemplary embodiments of the present invention.

FIG. 4 is an exemplary diagram of a normalized CCA coefficient determined by a controller provided in an SSVEP-based stimulus detection apparatus according to various exemplary embodiments of the present invention.

In FIG. 4, the vertical axis represents values of normalized CCA coefficients, and the horizontal axis represents time. It may be seen that the difference between the normalized CCA coefficients for stimuli is not large until the initial 0.5 seconds, but the difference increases as the time increases.

Therefore, when the slopes of the regression lines for stimuli are determined by performing analysis of covariance on the normalized CCA coefficients for stimuli until the initial 0.5 seconds, the difference between the slopes of the regression lines for stimuli may not be large.

However, when the slopes of the regression lines for stimuli are determined by performing analysis of covariance on the normalized CCA coefficients for stimuli until 1 second, the difference between the slopes of the regression lines for stimuli may be larger to recognize that a stimulus intended by the user is "410".

Thereafter, when the initial time window (reference time) is set to 0.5 seconds, an additional set time may be required several times to detect the stimulus intended by the user, but when the initial time window is set to 1 seconds, it may be possible to detect a stimulus intended by the user without requiring an additional set time. Here, it may be seen that the time window is adaptively changed according to the user's state. That is, the time required to detect the stimulus intended by the user may be short or long depending on the user's condition, but in any case, the accuracy of stimulus detection may be high.

Meanwhile, the controller 40 may determine the input timing of a user command, based on the normalized CCA coefficients for stimuli as shown in FIG. 4. In general, the user should pay attention to the stimulus notifying the input such that the BCI system can determine the timing of the user's command input. Whenever a user inputs a command, it is inconvenient to have to watch a stimulus that notifies the input. As a result, the controller 40 may determine the input timing of the user command based on the normalized CCA coefficients for stimuli without a marker or trigger indicating the start of using the BCI.

Figure 5:
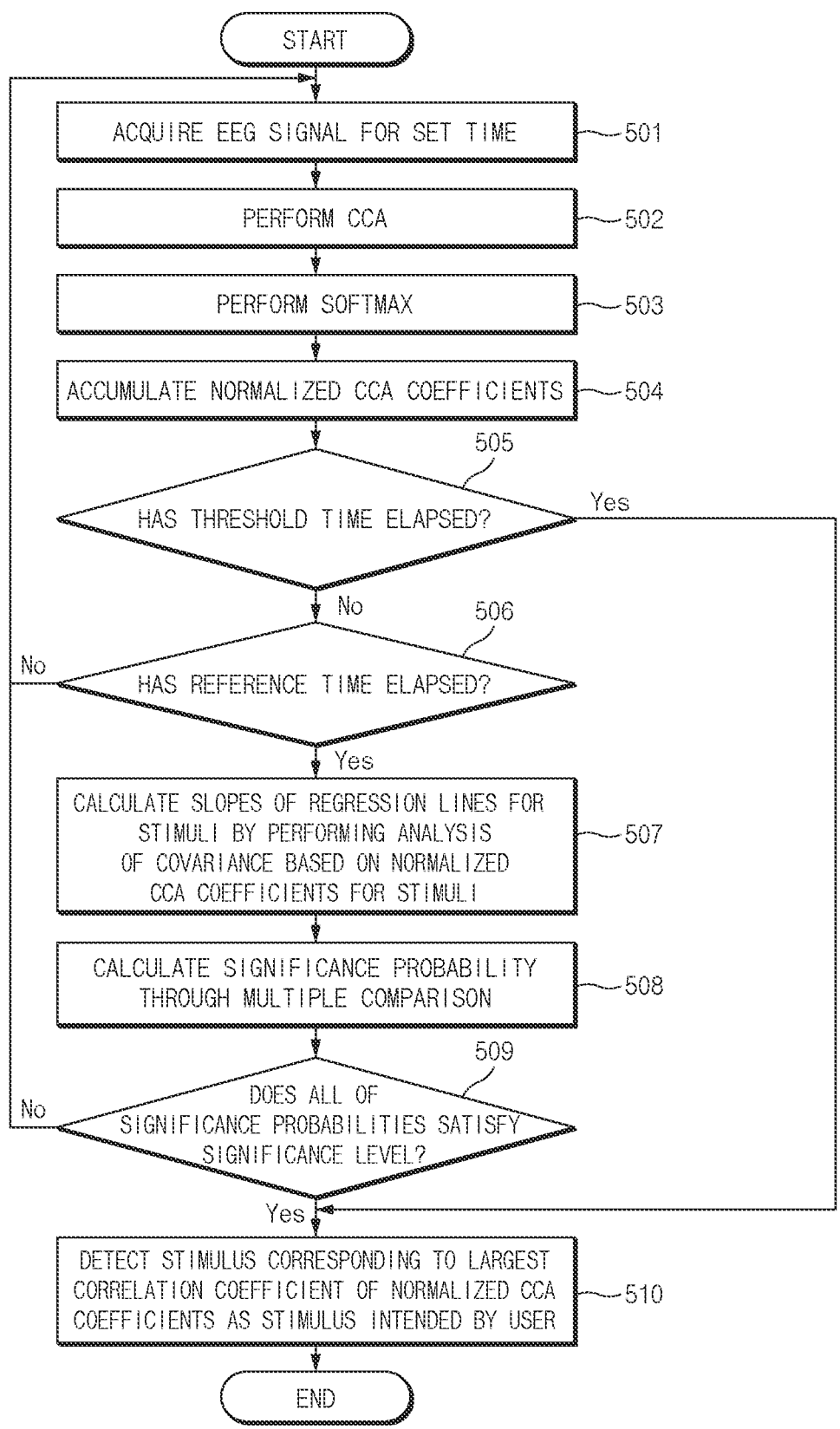
FIG. 5 is a flowchart of an SSVEP-based stimulus detection method according to various exemplary embodiments of the present invention.

FIG. 5 is a flowchart of an SSVEP-based stimulus detection method according to various exemplary embodiments of the present invention, which is performed by the controller 40.

First, the controller 40 may acquire EEG signals for a predetermined time period (e.g., 0.1 second) (501). In the instant case, the set time may mean a time required to acquire the minimum EEG signal required to perform Canonical Correlation Analysis (CCA).

Thereafter, the controller 40 may determine CCA coefficients for stimuli by performing CCA on a plurality of reference signals having different stimulation frequencies and the multi-channel EEG signal of a user (502).

Thereafter, the controller 40 may perform softmax on the CCA coefficients for stimuli and normalize the CCA coefficients.

Thereafter, the controller 40 may accumulate the normalized CCA coefficients for stimuli (504).

Thereafter, the controller 40 may determine whether a threshold time (e.g., 4 seconds) has elapsed since starting the logic (505).

As a result of the determination (505), when the threshold time has not elapsed, the controller 40 may proceed to "506", and when the threshold time has elapsed, the controller 40 may proceed to "510".

Thereafter, the controller 40 may determine whether a reference time (e.g., 0.5 seconds) has elapsed after starting the logic (506).

As a result of the determination (506), when the reference time has not elapsed, the controller 40 may proceed to "501", and when the reference time has elapsed, the controller 40 may determine slopes of regression lines for stimuli by performing analysis of covariance based on the normalized CCA coefficients for stimuli (507)

Thereafter, the controller 40 may perform multiple comparison (508). That is, the controller 40 may determine significance probabilities for differences between the largest slope among the determined slopes of the regression lines for stimuli and each of the remaining slopes.

Thereafter, the controller 40 may determine whether all of the significance probabilities satisfy a significance level (509).

As a result of the determination (509), when all of the significance probabilities do not satisfy the significance level, the controller may proceed to "501", and when all of the significance probabilities satisfy the significance level, the controller may detect a stimulus corresponding to the largest CCA coefficient among the normalized CCA coefficients as a stimulus intended by a user (510).

Although a CCA method that does not require training (zero-training) has been referred to as an example in the exemplary embodiment of the present invention, a subject-independent Filter Bank Canonical Correlation Analysis (FBCCA) method, or an object-dependent Task-Related Component Analysis (TRCA) method or the like may be used.

When using the FBCCA method as another exemplary embodiment of the present invention, operation "502" may be substituted with operation in which "the controller 40 determines FBCCA coefficients for stimuli by performing FBCCA on a plurality of reference signals having different stimulation frequencies and the multi-channel EEG signal of the user (502)."

Furthermore, in the case of using the TRCA method as another exemplary embodiment of the present invention, operation "502" may be substituted with operation in which "the controller 40 determines TRCA coefficients for stimuli by performing TRCA on a plurality of reference signals having different stimulation frequencies and the multi-channel EEG signal of the user (502)."

Figure 6:
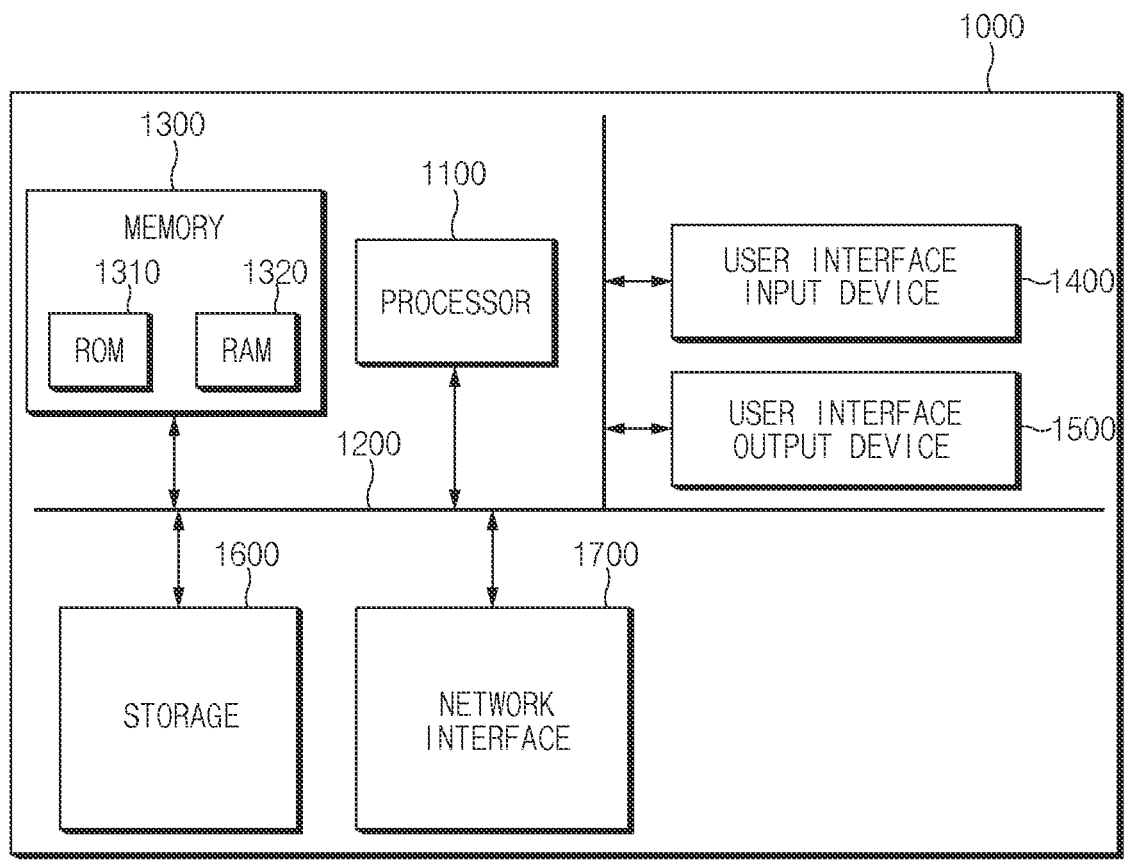
FIG. 6 is a block diagram illustrating a computing system for executing an SSVEP-based stimulus detection method according to various exemplary embodiments of the present invention.

FIG. 6 is a block diagram illustrating a computing system for executing an SSVEP-based stimulus detection method according to various exemplary embodiments of the present invention.

Referring to FIG. 6, an SSVEP-based stimulus detection method according to various exemplary embodiments of the present invention as described above may be further implemented through a computing system. A computing system 1000 may include at least one processor 1100, a memory 1300, a user interface input device 1400, a user interface output device 1500, storage 1600, and a network interface 1700, which are connected to each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present invention, and various modifications and variations may be made without departing from the essential characteristics of the present invention by those skilled in the art to which various exemplary embodiments of the present invention pertains.

Therefore, the exemplary embodiments of the present invention are provided to explain the spirit and scope of the present invention, but not to limit them, so that the spirit and scope of the present invention is not limited by the embodiments. The scope of protection of the present invention may be interpreted by the following claims, and all technical ideas within the scope equivalent thereto may be construed as being included in the scope of the present invention.

As described above, the SSVEP-based stimulus detection device and the method thereof may periodically determine correlation coefficients between a plurality of reference signals having different stimulation frequencies and multi-channel EEG signals of a user for a reference time, determine slopes of regression lines for stimuli by performing analysis of covariance on a plurality of correlation coefficients for stimuli (stimulation frequencies) as determined, and detect the user's intended stimulus through a plurality of comparison between the determined slopes of the regression lines for stimuli to rapidly and accurately detect the stimulus intended by the user without a prior learning process.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can further be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like. In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Steady-State Visual Evoked Potential (SSVEP)-based stimulus detection device, comprising:
    a sensor configured to acquire a multichannel ElectroEncephaloGram (EEG) signal;
    a storage configured to store a plurality of reference signals having different stimulation frequencies; and
    a controller electrically connected to the sensor and the storage and configured to periodically determine correlation coefficients between the plurality of reference signals and the multichannel EEG signal for a reference time, normalize the determined plurality of correlation coefficients for stimuli, determine slopes of regression lines for stimuli by performing analysis of covariance on the normalized plurality of correlation coefficients for stimuli, and detect a stimulus intended by a user according to the determined slopes of the regression lines for stimuli.

2. The SSVEP-based stimulus detection apparatus of claim 1,
    wherein the controller is configured to determine significance probabilities for differences between a largest slope among the determined slopes of regression lines for stimuli and each of remaining slopes, and when all of the significance probabilities satisfy a significance level, detect a stimulus corresponding to a largest correlation coefficient of the plurality correlation coefficients as the stimulus intended by the user.

3. The SSVEP-based stimulus detection apparatus of claim 2, wherein the controller is configured to determine the significance probabilities for differences between the largest slope among the determined slopes of regression lines for stimuli and each of the remaining slopes, and when all of the significance probabilities do not satisfy the significance level, additionally determine and accumulate correlation coefficients between the plurality of reference signals and the multichannel EEG signal.

4. The SSVEP-based stimulus detection apparatus of claim 1, wherein the controller is configured to normalize the determined plurality of correlation coefficients for stimuli through softmax.

5. The SSVEP-based stimulus detection apparatus of claim 1, wherein the correlation coefficient is Canonical Correlation Analysis (CCA) coefficients.

6. The SSVEP-based stimulus detection apparatus of claim 1, wherein the multichannel EEG signal is determined by Steady-State Visual Evoked Potential.

7. The SSVEP-based stimulus detection apparatus of claim 1, wherein the controller is configured to determine input timing of the user based on the normalized plurality of correlation coefficients for stimuli.

8. The SSVEP-based stimulus detection apparatus of claim 1, further including:
    a display electrically connected to the controller and configured to display the stimulus intended by the user.

9. The SSVEP-based stimulus detection apparatus of claim 1, wherein the correlation coefficients are Filter Bank Canonical Correlation Analysis (FBCCA) coefficients or Task-Related Component Analysis (TRCA) coefficients.

10. A Steady-State Visual Evoked Potential (SSVEP)-based stimulus detection method comprising:
    periodically determining, by a controller, correlation coefficients between a plurality of reference signals and a multichannel ElectroEncephaloGram (EEG) signal for a reference time;
    normalizing, by the controller, the determined plurality of correlation coefficients for stimuli;
    determining, by the controller, slopes of regression lines for stimuli by performing analysis of covariance on the normalized plurality of correlation coefficients for stimuli; and
    detecting, by the controller, a stimulus intended by a user based on the determined slopes of regression lines for stimuli.

11. The SSVEP-based stimulus detection method of claim 10, wherein the detecting of the stimulus intended by the user includes:
    determining significance probabilities for differences between a largest slope among the determined slopes of regression lines for stimuli and each of remaining slopes;
    when all of the significance probabilities satisfy a significance level, detecting a stimulus corresponding to a largest correlation coefficient of the plurality correlation coefficients as the stimulus intended by the user.

12. The SSVEP-based stimulus detection method of claim 11, wherein
    when all of the significance probabilities do not satisfy the significance level, additionally determining and accumulating correlation coefficients between the plurality of reference signals and the multichannel EEG signal.

13. The SSVEP-based stimulus detection method of claim 10, wherein the normalizing of the determined plurality of correlation coefficients for stimuli includes normalizing the determined plurality of correlation coefficients for stimuli through softmax.

14. The SSVEP-based stimulus detection method of claim 10, wherein the correlation coefficient is a Canonical Correlation Analysis (CCA) coefficient.

15. The SSVEP-based stimulus detection method of claim 10, wherein the multichannel EEG signal is determined by Steady-State Visual Evoked Potential.

16. The SSVEP-based stimulus detection method of claim 10, further including:
   displaying, by a display connected to the controller, the stimulus intended by the user.

17. The SSVEP-based stimulus detection method of claim 10, wherein the correlation coefficients are Filter Bank Canonical Correlation Analysis (FBCCA) coefficients or Task-Related Component Analysis (TRCA) coefficients.

* * * * *